Jan. 10, 1933. E. F. DOHT 1,894,164
FISHING POLE CARRIER
Filed April 27, 1931
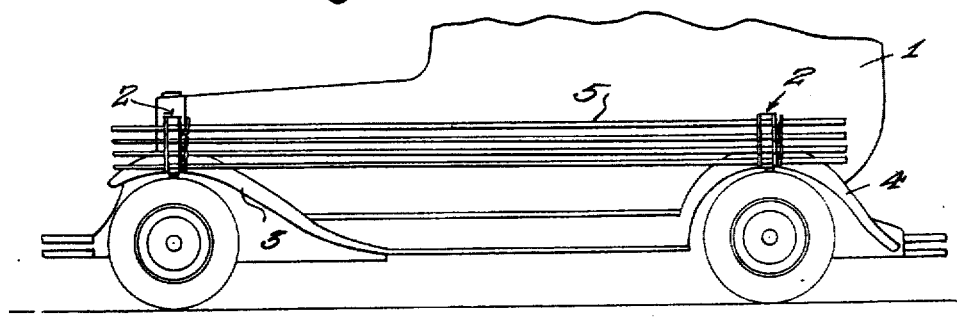
*Fig. 1.*
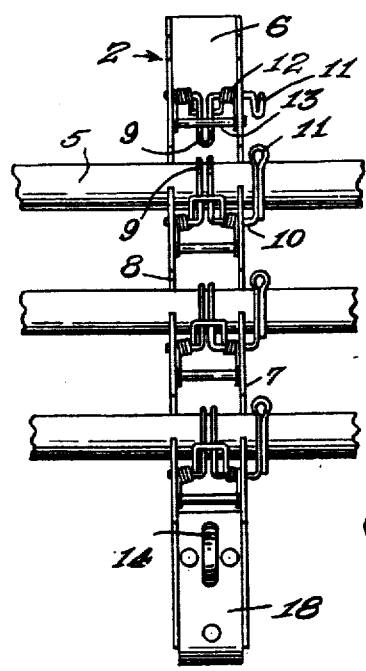
*Fig. 2.*
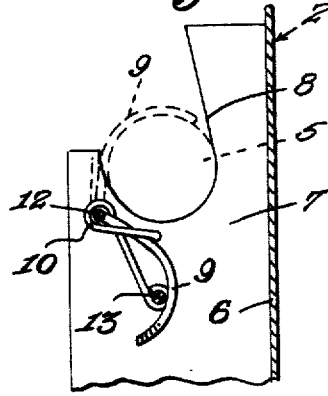
*Fig. 5.*
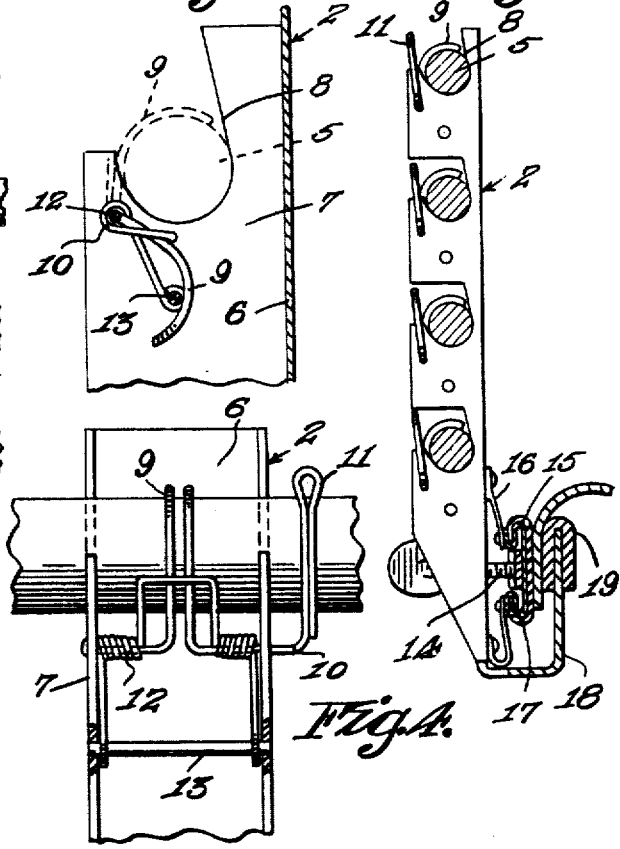
*Fig. 3.*
*Fig. 4.*
Elvin F. Doht, INVENTOR
by Victor J. Evans and Co., ATTORNEY
WITNESS:

Patented Jan. 10, 1933

1,894,164

UNITED STATES PATENT OFFICE

ELVIN F. DOHT, OF QUINCY, ILLINOIS

FISHING POLE CARRIER

Application filed April 27, 1931. Serial No. 533,278.

This invention relates to carriers especially adaptable for use on motor vehicles for supporting fishing poles and other similar devices on the exterior of said motor vehicle and has for the primary object, the provision of racks which may be easily and quickly applied to the fenders at one side of the vehicle, whereby poles and the like of considerable length, which may not be conveniently carried within the vehicle, may be received and held firmly to the vehicle in spaced relation thereto and to each other, thereby obviating injury to the finish of the vehicle or injury to each other and whereby the poles will be prevented from having accidental movements with respect both to the vehicle and to themselves and will be prevented from rattling or making undesirable noise during the travel of the vehicle.

Another object of this invention is the provision of a carrier of the above stated character which may be simple, durable and efficient and which may be manufactured and sold at a comparatively low cost.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary side elevation of a motor vehicle with a carrier applied thereto and supporting poles and constructed in accordance with my invention.

Figure 2 is a front elevation illustrating one of the racks.

Figure 3 is a side elevation partly in section illustrating the attachment of one of the racks to the fender of the vehicle.

Figure 4 is an enlarged fragmentary view partly in section illustrating the means of holding a pole in the rack.

Figure 5 is a fragmentary sectional view illustrating the same.

Referring in detail to the drawing the numeral 1 indicates the fragmentary portion of a motor vehicle having racks 2 secured to the front and rear fenders 3 and 4 thereof for the purpose of supporting at one side of the vehicle a plurality of poles or similar devices 5 in spaced relation to each other and to the side of the vehicle and fenders thereof, obviating any possibility of the poles or similar devices chafing each other or the finish of the vehicle. The racks are adapted to firmly retain the devices 5 upon the vehicle against accidental movement and prevent rattling thereof and will permit the devices 5 to be easily and quickly applied and removed from the vehicle when desired.

The racks 2 are identical in construction and reference to one is thought sufficient for both. The rack includes a channel shaped member 6, the side walls 7 of which have formed therein aligning notches 8 to receive the devices 5 which are retained within the notches against undue movement by hook-shaped elements 9 formed integral with shafts 10 journalled in the side walls and provided with handles 11. The hook shaped elements 9, shafts 10 and handles 11 are each constructed from a single length of material, first bent to form the hook with laterally extending portions providing a shaft with one end bent angularly and upon itself to form the handle 11. Each of the shafts has mounted thereon a tension means 12 which bears against the hook-shaped element and a bar 13 carried by the side walls 7, so that the hook-shaped element is normally urged in one direction for the purpose of placing pressure upon the device 5 located within the respective notch 8 of the side walls. The tension means 12 is preferably in the form of connected spaced coils mounted on the shaft at the opposite side of the hook-shaped element with the ends of the element secured to the bar 13 and with the connecting portions of the coils bearing against the hook-shaped elements. The tension means 12 is adapted to swing the hook-shaped element into engagement with the bar 13 when the respective notch is unoccupied. To place a pole or device in a notch of the rack the handle 11 is moved in one direction against the action of the tension means 12, which positions the hook-shaped element 9 so that the device 5 can be easily placed within the notch and when the handle 11 is freed the tension means moves the hook-shaped element into engagement with the device 5 with sufficient pressure to retain the latter firmly in the rack.

The channel shaped member 6 has the side walls adjacent their lower ends tapered and carries a set bolt 14 adapted to engage a clamp plate 15 supported by resilient arms 16 attached to the member 6. Rubber or similar cushioning material 17 is secured to the plate 15 to prevent marring of the surface of the fender when engaged therewith. An angle iron bracket 18 is carried by the member 6 and has a cushion element 19 mounted thereon adapted to engage an opposite face of the fender from that engaged by the cushion material of the plate 15. With the plate 15 bearing against the fender and the bracket 18 in engagement with the fender, the rack will be efficiently attached to the fender. This arrangement for clamping the rack to the fender prevents marring of said fender and permits the rack to be easily applied and removed from the fender, when desired.

While I have shown and described the preferred embodiment of my invention, it will be understood that minor changes in construction, combination and arrangement of parts may be made without departing from the spirit and scope of my invention, as claimed.

Having thus described my invention, what I claim is:

A carrier for poles comprising vertically disposed channel shaped supporting members detachably secured to the fenders at one side of a vehicle and each having aligned notches in the side walls thereof to receive poles, shafts journalled to the side walls of the members adjacent the notches, hook shaped elements formed integrally with the shafts to engage over and force the poles against the walls of the notches, tension means for each shaft including coiled portions mounted on the respective shafts and connected by an intermediate portion engaging the respective hook shaped elements and said coiled portions having the other ends thereof secured to the supporting members, and a handle on each shaft.

In testimony whereof I affix my signature.

ELVIN F. DOHT.